United States Patent [19]

Easter et al.

[11] Patent Number: 4,620,888

[45] Date of Patent: Nov. 4, 1986

[54] LABELING APPARATUS

[75] Inventors: William M. Easter, Solon; Eric Gifford, Cleveland Heights; Rick S. Wehrmann, Hudson; Dana Liebhart, Cuyahoga Falls, all of Ohio

[73] Assignee: Automated Packaging Systems, Inc., Twinsburg, Ohio

[21] Appl. No.: 646,954

[22] Filed: Sep. 4, 1984

[51] Int. Cl.<sup>4</sup> ............................................. B32B 31/00
[52] U.S. Cl. ........................................ 156/64; 53/291; 53/297; 53/585; 74/54; 74/104; 156/86; 156/352; 156/443; 156/510
[58] Field of Search .................... 156/64, 86, 361–364, 156/350–352, 443; 53/291, 297, 585; 74/53, 54, 104

[56] References Cited

U.S. PATENT DOCUMENTS

| | | | |
|---|---|---|---|
| 3,102,696 | 9/1963 | Larsh | 74/53 X |
| 3,442,145 | 5/1969 | Lemper | 74/54 |
| 3,911,754 | 10/1975 | Ditto | 74/104 X |
| 4,044,619 | 8/1977 | Koch et al. | 74/53 |
| 4,412,876 | 11/1983 | Lerner et al. | 156/64 |

Primary Examiner—David Simmons
Attorney, Agent, or Firm—Watts, Hoffmann, Fisher & Heinke Co.

[57] ABSTRACT

An apparatus and method for applying tubular labels to a product container at a labeling station including a reciprocally movable labeling assembly. The assembly is adjustably secured to carriage that is mounted for reciprocating movement at the labeling station. A drive system including a drive cam defining an asymetrical profile is operatively coupled to the carriage by a lever arrangement including a cam follower driven by the drive cam. The profile of the drive cam is configured to have a steep rise and a gradual drop so that the average speed at which the labeling assembly is driven through a label applying strobe is substantially less than the speed at which the assembly is driven through a return stroke thus reducing the stress applied to the label as it is installed. A fluid pressure operated actuator pressurized to a first predetermined pressure exerts a biasing force on the lever to urge the cam follower into contact with the drive cam. A sensor monitors the contact between the follower and cam and de-energizes the drive system and arrests rotation of the drive cam in the event loss of contact between the follower and the cam is sensed. The fluid pressure operated actuator can also be pressurized to a second predetermined pressure in order to drive the carriage to a retracted position. An indexing cam is co-driven with the carriage drive cam and operates a bottle advancing mechanism in synchronization with the labeling assembly.

28 Claims, 14 Drawing Figures

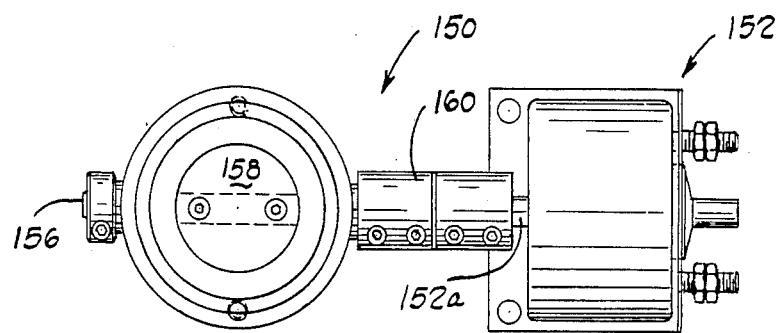
Fig. 9
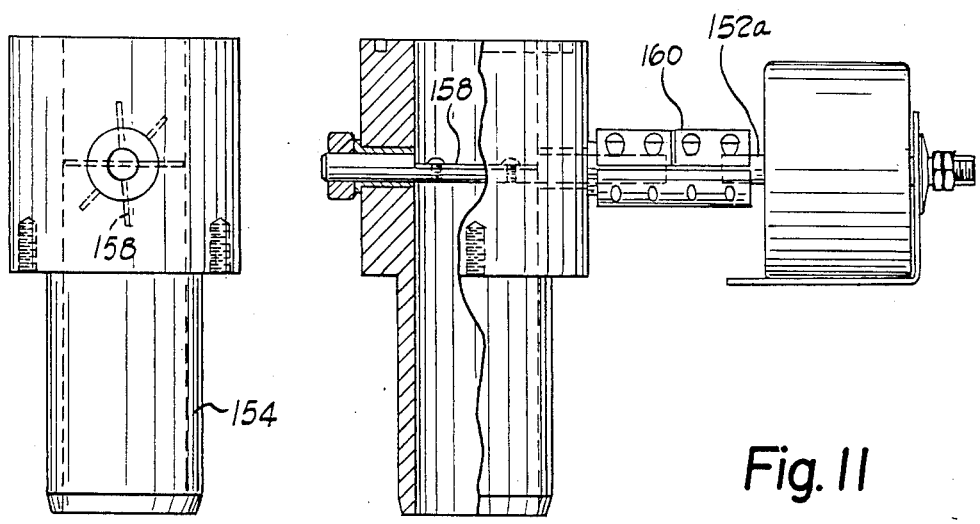
Fig. 10
Fig. 11

LABELING APPARATUS

1. TECHNICAL FIELD

The present invention relates generally to apparatus and methods for labeling products and in particular to an apparatus and method for applying flexible, tubular labels to product containers.

2. BACKGROUND ART

The labeling of product containers, such as bottles, can be done by various methods. Early methods involved either printing information directly onto the container or alternately printing the information on a label which was then adhesively bonded to the container.

A more recent labeling method involves the application of a tubular, flexible label to the bottle. Typically, the label is preprinted with the product's name and product information and the label is then pulled over the container either manually or by machine.

The use of tubular, flexible labels have become a common way of labeling plastic, "2 liter" bottles which are popular containers for soft drinks. In general, these plastic containers are replacing glass bottles and metal cans more and more each year. The labeling of these types of containers can be time consuming and add significant cost to the product package.

Apparatus and methods for automatically placing tubular labels on product containers have been suggested. In U.S. Pat. No. 4,412,876 owned by the present assignee, a relatively high speed label applying machine is disclosed. The labeling apparatus and label applying method described in this patent have become commercially successful and are use by soft drink bottling companies, among others.

Bottles however, continuously strive to reduce operating costs. Typically, the labor costs are reduced by increasing the production speeds of the bottling and the label applying machinery. The material cost is reduced by reducing material thickness of the label itself.

It was found that the labeling machine described in the above referenced patent could reliably apply labels at the rate of approximately sixty bottles per minute. It is believed that operating the machine at much higher speeds would result in inconsistent or unreliable operation. Accordingly while the described machine is belived to have had the higher rate of label application that has been achieved commercially it is unable to mmet the bottlers' desires for even greater throughout.

It must be remembered that the labels themselves must withstand the rigors of the label applying process. By way of summary, the labels are usually supplied in the form of a continuous web. The individual labels are defined by longitudinally spaced, transverse perforations. The web is fed over a mandrel positioned above the bottle to be labeled. A gripper assembly grips the bottom of the label and pulls it downwardly over the bottle. At a predetermined position, the web is braked to prevent further movement thus causing the label held by the gripper assembly to sever itself from the remainder of the supply.

As the operating speed of the machine is increased it should be apparent that the forces applied to the web and the label being applied can be significant. As the material thickness of the web is descreased, the risk of damage to the label itself increases. Thus, it is not practical to simply increase the overall speed of the machine to increase the machine throughput. It is believed that the labels could not withstand the added stress or alternatively if the labels were made strong enough to withstand the forces they would be excessively heavy and therefore too costly.

The machine disclosed in U.S. Pat. No. 4,412,876 included a labeling assembly that was reciprocally actuated through a labeling cycle by a harmonic crank mechanism rotated by a drive motor. The bottles to be labeled were fed into the labeling machine by a separate drive arrangement including a clutch and drive motor that were energized to actuate an L-shaped pusher assembly for advancing the bottles. Although these mechanical arrangements operate satisfactorily it is believed that they could not reliably accommodate the higher throughput speeds desired by the bottling industry.

DISCLOSURE OF THE INVENTION

The present invention provides a new and improved apparatus and method for applying tubular, flexible labels to product containers such as plastic soft drink bottles. The disclosed apparatus is capable of extremely high speed operation without damage to bottles or labels.

According to the preferred and illustrated embodiment, the labeling apparatus includes a frame structure defining a work station; a labeling assembly forming part of the work station and operative to apply a label to a product container positioned in alignment with the assembly; and, a drive system for actuating the labeling assembly and for serially advancing product containers to a label applying position.

The labeling assembly is driven through a label applying stroke and a return stroke. During the label applying stroke a label is pulled onto the product container and severed from the supply. Near the end of the label applying stroke the label assembly releases the label and then is retracted to allow the labeled bottle to exit the work station and to allow an unlabeled bottle to advance into the work station. The next label to be applied is engaged just prior to beginning the label applying stroke.

According to the invention, the drive system actuates the labeling assembly at different rates and/or accelerations during the label applying and return strokes. Preferably, the average speed of the label applying stroke is slower than the return stroke. This permits an optimized rate of label application without risk of damage to the label as it is being applied to the container. At the same time, throughput is increased, as contrasted with the described prior machine, by substantially increasing the rate at which the labeling assembly returns after applying a label. The rate of the label applying stroke is slower than the return stroke, thus reducing the risk of a misfeed or damage to the label.

In the preferred embodiment, the drive system includes a cam rotatably driven by a suitable drive motor. The cam defines a profile having a rather steep rise for actuating the labeling assembly through the return stroke and a gradual drop for driving the assembly through the label applying stroke at lower average speed as compared to the return stroke In the exemplary embodiment, a label assembly actuating arm is pivotally connected to the frame. The arm carries a cam follower which rides against the actuating cam. The arm is also connected to the labeling assembly so that motion transmitted to the cam follower by the cam produces a reciprocating motion in the labeling assembly.

According to a feature of the invention, the cam follower is biased into abutting contact with the cam. In the preferred construction, the biasing is achieved by a pneumatic cylinder which is pressurized with a predetermined air pressure. The air is captured in the air cylinder and acts as a pneumatic spring. In accordance with this feature, the contact between the cam follower and cam is monitored by a sensor. Should the cam follower separate from the cam as would occur in the case of a malfunction in the labeling assembly, movement in the drive system is immediately arrested. Preferably, rotation in the cam is terminated virtually instantly by a brake system which is actuated in response to the sensed malfunction.

This feature provides an additional advantage. Normally, a malfunction or jam in the label applying apparatus requires that the apparatus be raised in order to clear the malfunction. In some prior machines, a counterweight was used to balance the weight of the labeling assembly so that an operator could manually raise the assembly when necessary. The pneumatic cylinder, although normally acting as a biasing device, is also used as a lifting device for the labeling assembly. In particular, when the operator desires to manually raise the labeling assembly, a control is provided for pressurizing and extending the pneumatic cylinder. The extension of the cylinder raises the labeling assembly. When the malfunction has been corrected, the operator merely actuates the control to depressurize the cylinder thus lowering the labeling assembly and associated actuating lever into contact with the drive cam.

According to another feature of the invention, a pusher assembly for indexing or advancing product containers into the labeling station is actuated by the same drive system that actuates the labeling assembly. This feature eliminates the need for a separate clutch and drive motor for operating the advancing mechanism.

In the preferred embodiment, the drive system includes an indexing cam, co-driven with the main drive cam. The second cam actuates linkage connected to the pusher assembly. By driving both the primary and indexing cams with a common device, i.e. shaft, synchronization of the labeling operation with the container indexing function is automatically achieved. The linkage for actuating the pusher assembly also includes a pressurized pneumatic cylinder for exerting a biasing force on the associated cam follower to maintain contact between it and the indexing cam.

According to another feature of the invention, an improved container stabilizing device is employed to maintain the position of a container at the labeling station. In the labeling machine disclosed in U.S. Pat. No. 4,412,876, a vacuum port was located at the labeling station which during operation was connected to a continuous source of vacuum. A perforate plate covered the vacuum port and formed a support for the bottle being labeled. At the conclusion of the labeling process, the label container was pushed off the vacuum port by next adjacent container.

According to this feature of the invention, the container to be labeled is supported by a vacuum pedestal, including a vacuum port, located in alignment with the labeling apparatus, that includes a valve for controlling the communication of a vacuum source with the vacuum port. With the disclosed arrangement, the vacuum generated gripping force is terminated at the conclusion of the labeling process to facilitate sliding movement of the bottle off the vacuum pedestal. In the preferred method, the valve is reopened to communicate vacuum to the port as the next bottle to be labeled advances onto the pedestal.

In the preferred embodiment of this feature, a filter compartment is located intermediate the vacuum pedestal and the vacuum source to prevent the entry of contaminants into the vacuum system. In accordance with this feature, the conduit and filter compartment act as an accumulator when the communication of vacuum to the port is terminated by the valve. As a result of the accumulating effect, when the valve initially opens, a large inrush of air occurs and enhances the gripping force on the advancing bottle. At the initial opening of the valve, the sudden surge of air occurs at a rate that is greater than the steady state flow of air into the port and produces an increased temporary gripping force. Since the valve opens as the product to be labeled is advancing onto the perforate port, this initial inrush serves to grip and quickly stabilize the product on the port.

The disclosed apparatus and method applies tubular labels to product containers such as soft drink bottles at high speeds without degrading the appearance of the label or the reliability of the machine. This is achieved by a drive arrangement that applies the label to the product at an average speed that is lower than the average speed at which the labeling assembly is retracted. For an example, it has been found that a drive system embodying the present invention can actuate the label applying apparatus at a rate equivalent to 120 operations per minute during the return stroke. During the label applying stroke the label assembly is driven at a rate corresponding to 60 label applications per minute. Although the label applying portion of the operating cycle moves at a rate comparable to that of a prior machine, the increased speed at which the label assembly is returned results in an effective production rate for the improved machine of 90 label applications per minute. This production rate is substantially greater than the production rate of prior machines.

Additional features of the invention will become apparent and a fuller understanding obtained by reading the following detailed description made in connection with the accompanying drawings.

BEST MODE FOR CARRYING OUT THE INVENTION

Figure 1:
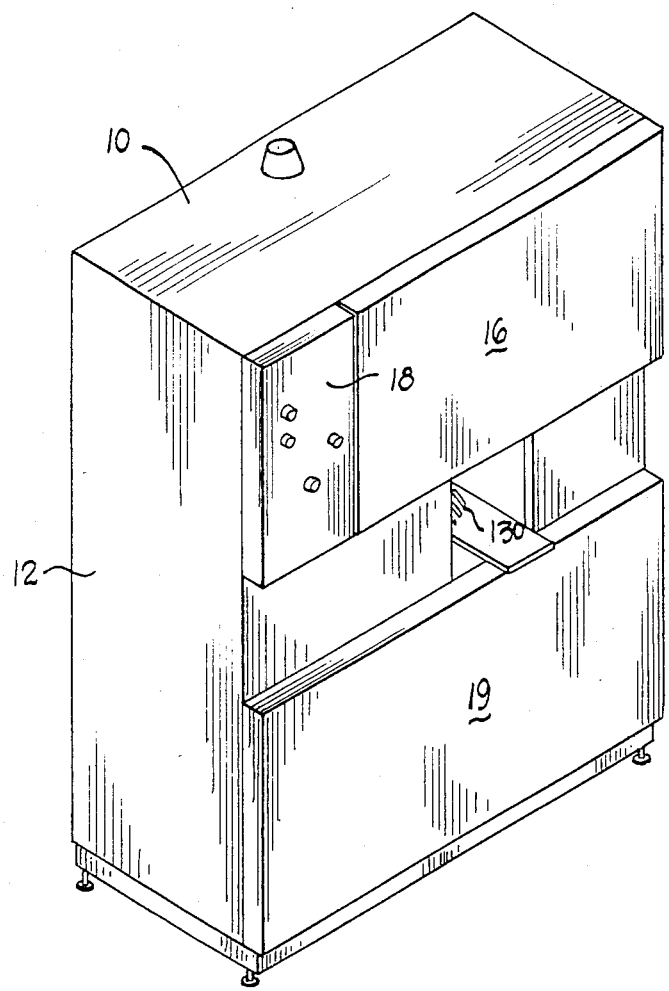
FIG. 1 is an isometric view of a labeling apparatus constructed in accordance with a preferred embodiment of the invention.
Figure 2:
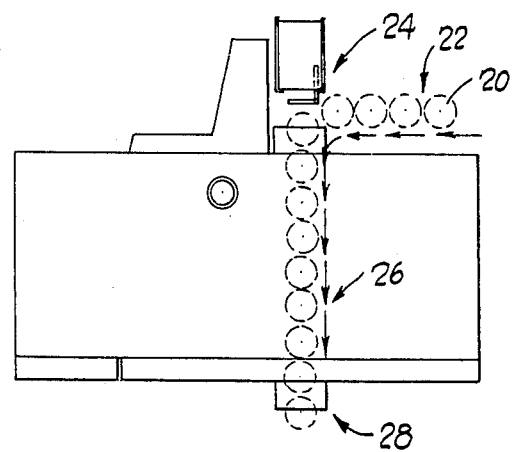
FIG. 2 is a top plan view of the labeling apparatus.

FIG. 1 illustrates the external appearance of a labeling apparatus constructed in accordance with the preferred embodiment of the invention. The labeling apparatus includes a sheet metal cabinet formed by a plurality of removable covers 10, 12, 14, 16. A control panel 18 contains a plurality of operator controls for controlling the operation of the apparatus. The disclosed labeling apparatus is adapted to apply tubular, flexible labels to containers such as "2 liter" soft drink bottles. Referring also to FIG. 2, the bottles 20 are brought to the machine on a conveyor, indicated by the reference character 22. An L-shaped pusher assembly, indicated generally by the character 24 advances bottles towards a labeling station indicated generally by the reference character 26. After it is labeled, the bottle is pushed out of the labeling position by the next advancing bottle. An exit conveyor (not shown) carries the labeled bottles from the exit of the labeling apparatus, indicated generally by the reference character 28.

Figure 3:
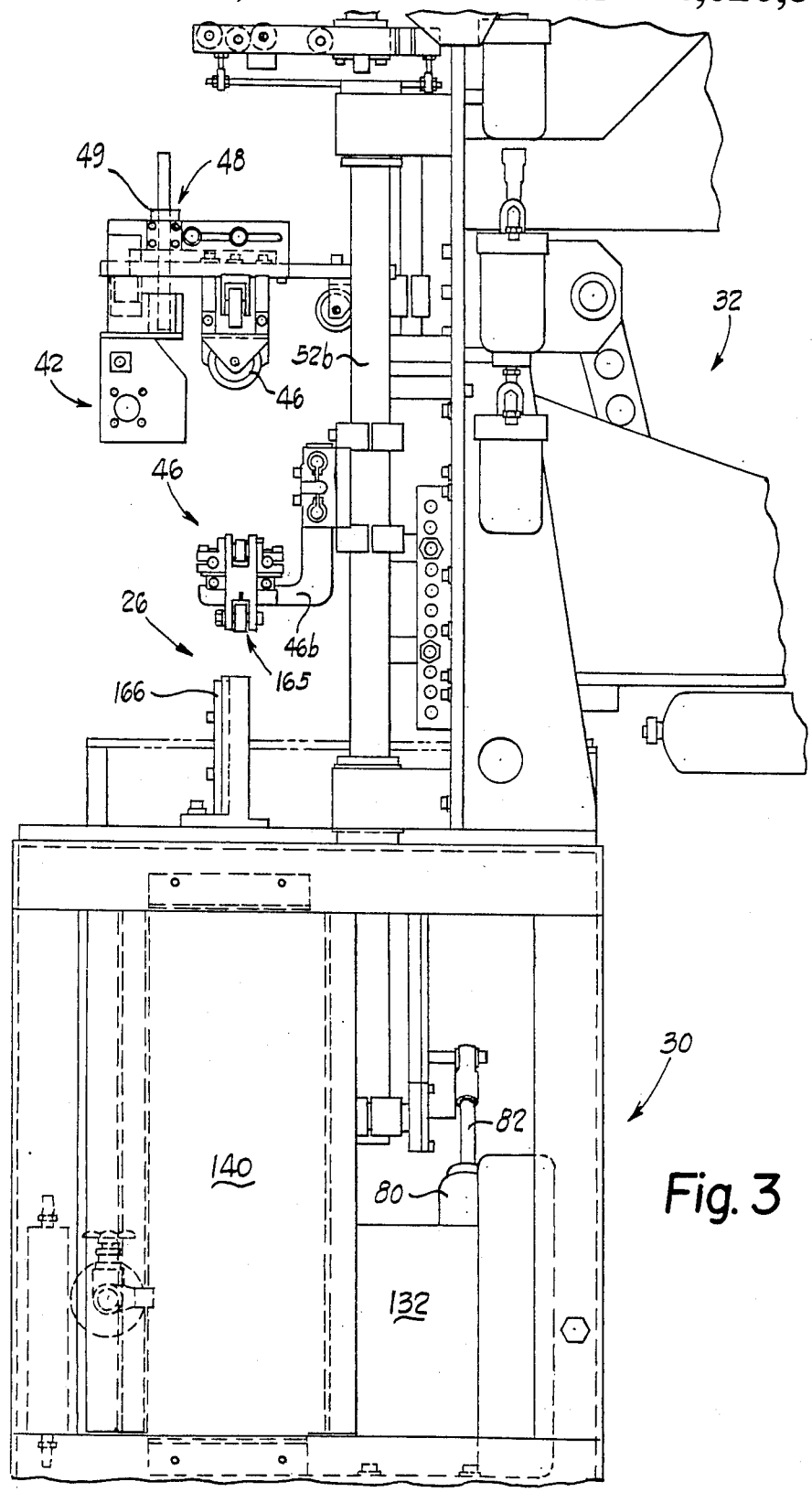
FIG. 3 is a side elevational view of the apparatus, with covers removed to show interior detail.
Figure 4:
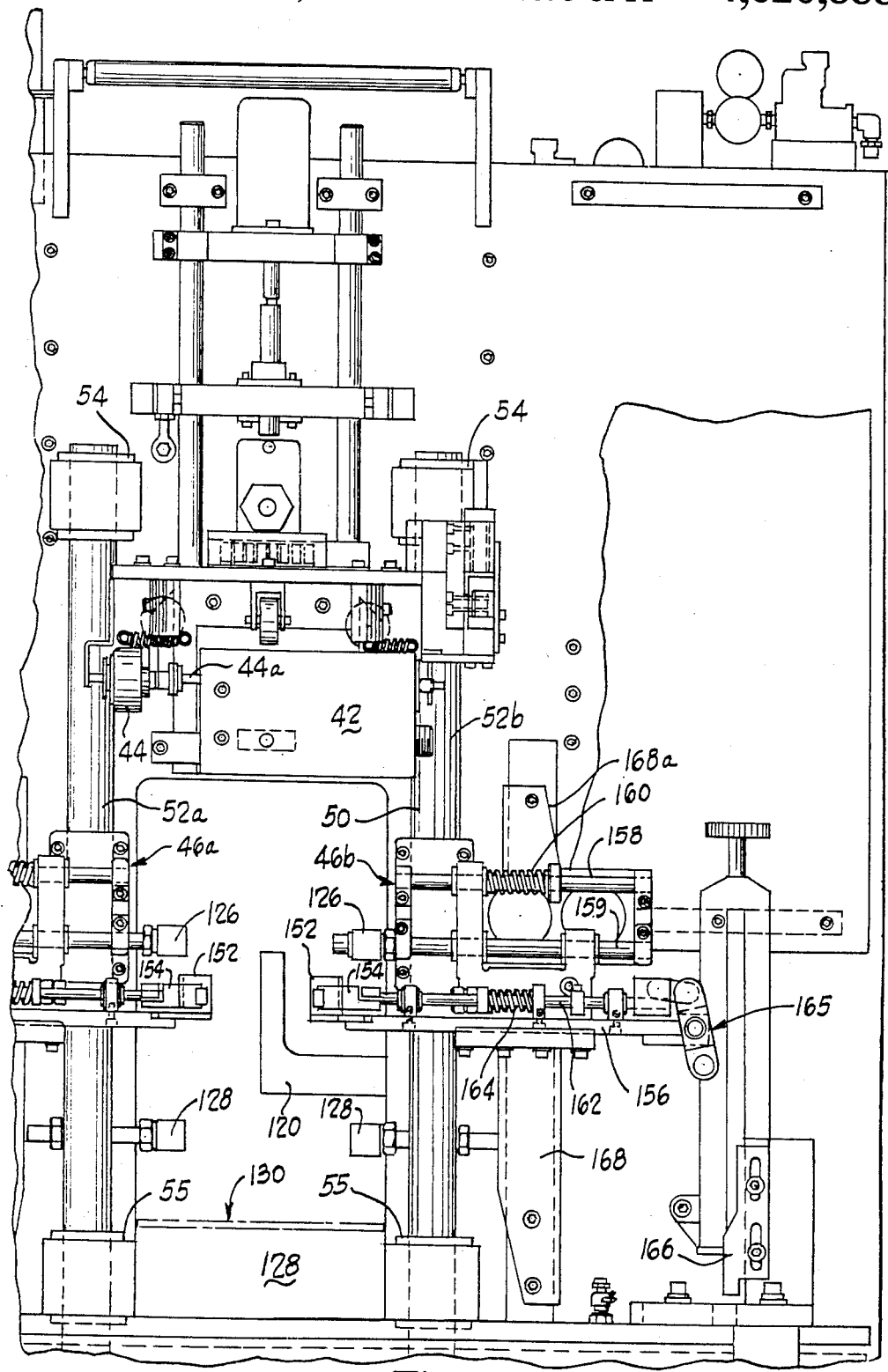
FIG. 4 is a front, fragmentary view of the upper portion of the labeling apparatus, with covers removed.

Turning now to FIG. 3, the internal construction of the labeling apparatus is illustrated. A base or lower portion 30 of the apparatus supports and mounts a drive system constructed in accordance with the preferred embodiment of the invention. An upper portion 32 defines the labeling station indicated generally by the reference character 26. Referring also to FIG. 4, the upper portion 32 includes a supply of labels (not shown) preferably comprising a continuous tubular web 34 (shown only in FIG. 8) wound on a supply spindle (not shown), each individual label being defined by a pair of longitudinally spaced, transverse perforations 34a. As is fully disclosed in U.S. Pat. No. 4,142,876, the web of labels is fed over a mandrel 40 (shown in FIG. 8 only) and then pulled over a product container 41 positioned below the mandrel. During the application process the label being applied is severed from the web 34.

Figure 8:
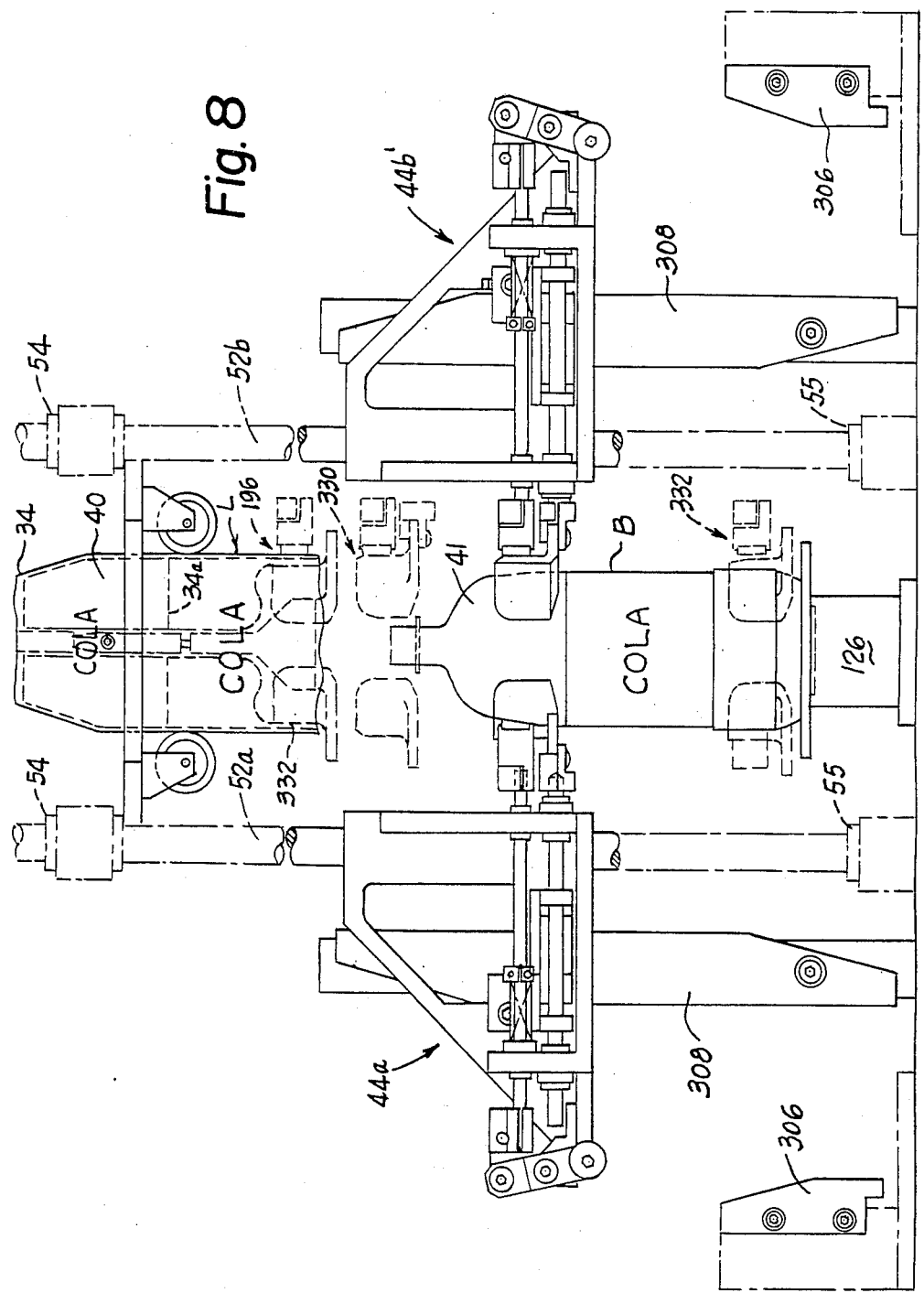
FIG. 8 is a front elevational view of a labeling assembly forming part of the labeling apparatus; and, FIGS. 9–11 illustrate the construction of a vacuum valve for controlling the communication of a vacuum source with a vacuum pedestal.

Referring to FIGS. 3, 4 and 8, the apparatus for applying the label to a container positioned at the labeling station includes a label position detector 42 and a web braking device 44. The detector 42 and other parts are omitted from FIG. 8 in order to illustrate the details of the mandrel 40 and other related components. In the disclosed embodiment, the web braking device 44 comprises a solenoid operated plunger 44a (shown in FIG. 4) which when actuated, clamps the web against the stationary mandrel so that as the leading label is pulled downwardly by a label applying assembly 46, the leading label is severed from the remainder of the web along the label defining perforations 34a (shown in FIG. 8).

The web position detector 42 senses indicia on each successive label when such labels are properly positioned with respect to the mandrel 40 and produces a web braking signal. The web position indicia are accurately located on each label and the detector 42 and mandrel 40 are positioned so that the lowermost edge of each label is aligned with the detector 42. The detector is preferably designed to detect wave shifted light emitted by a normally invisible, or nearly invisible, registration mark printed on each label. The preferred detector 42 can be constructed as disclosed by U.S. application Ser. No. 253,193 filed Apr. 27, 1981 and entitled "Control Marking Detector", the disclosure of which is incorporated herein its entirety by reference. Because additional details of the construction and operation of the detector 42 can be had by consulting the above referenced application, no further detailed description is necessary here. The detector 42 is adjustably supported relative to the labeling station 26 by a support assembly 48. The support assembly 48 includes clamps 49 by which the assembly 48 is connected to supporting rods 51 to enable the support assembly 48 to be adjustably positioned vertically as desired and clamped in place.

Figure 5:
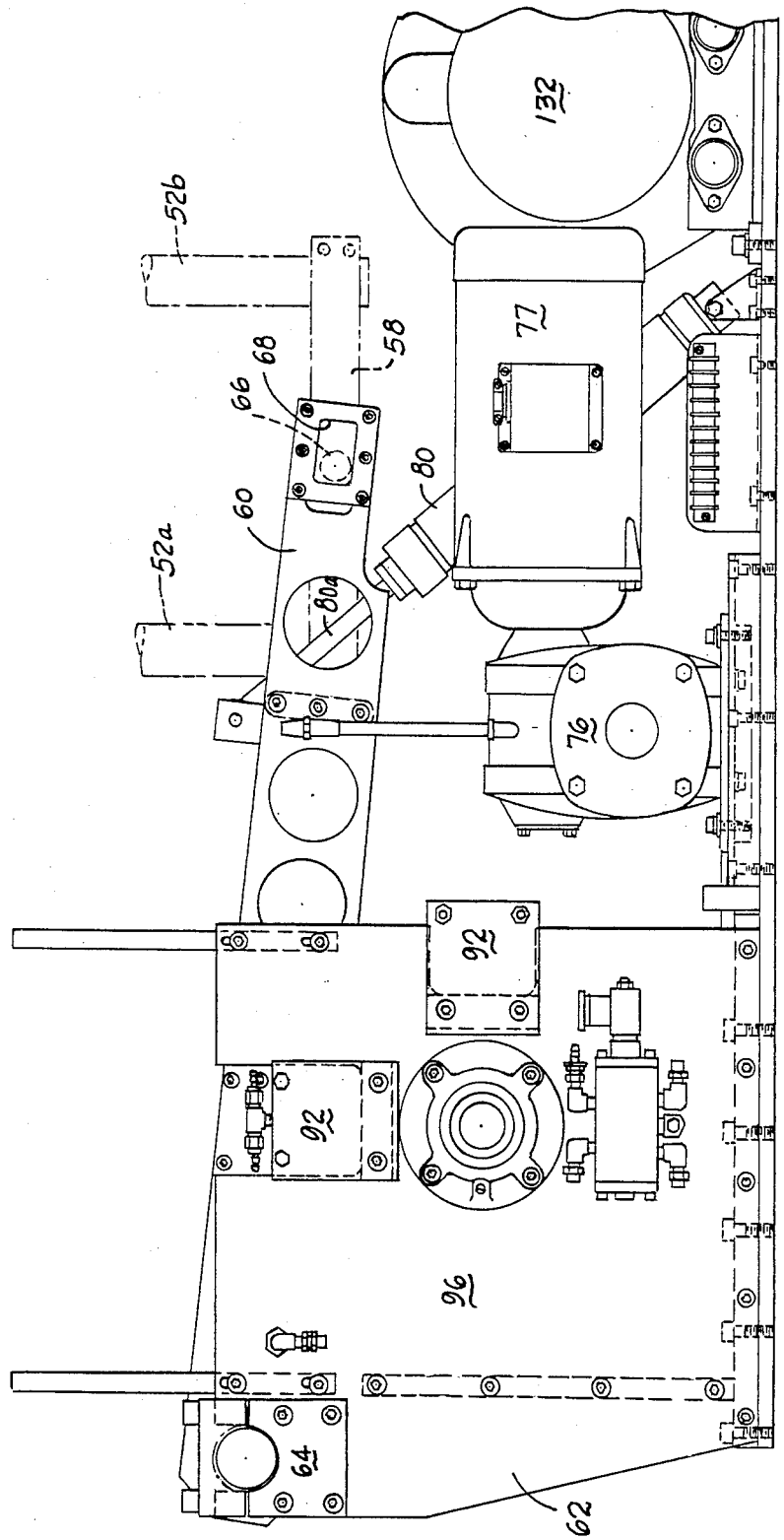
FIG. 5 is a front, fragmentary view of the lower portion of the labeling apparatus, with covers removed.

The label applying assembly 46 is reciprocally movable in a vertical plane by a carriage 50 operatively connected to the drive system located in the base 30 of the apparatus. Referring also to FIG. 5, the carriage 50 includes a pair of slide rods 52a, 52b that are slidably supported by upper and lower slide bearings 54, 55. As seen in FIG. 4, left and right hand halves 46a, 46b of the labeling applying apparatus 46 are adjustably clamped to the left and right slide rods 52a, 52b, respectively.

Figure 6:
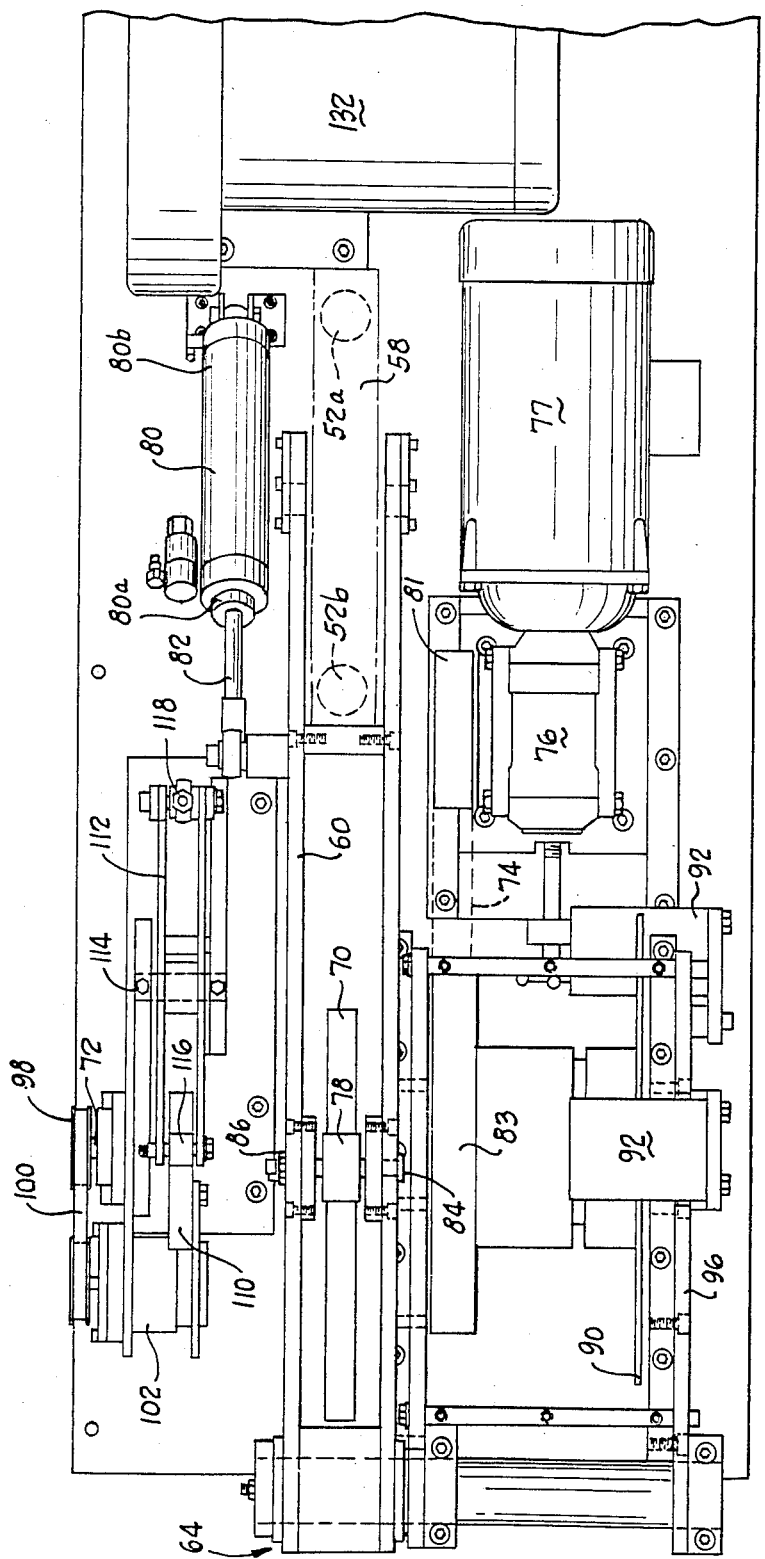
FIG. 6 is a plan view of the mechanism shown in FIG. 5.

Turning now to FIGS. 5 and 6, the drive system for the labeling assembly 44 is shown in detail. The reciprocal slide rods 52a, 52b are rigidly interconnected by a cross piece 58. Reciprocal, vertical movement is imparted to the cross piece 58 and hence the slide rods 52a, 52b by a lever arm 60. As viewed in FIG. 5, the lever arm 60 is pivotally connected at its leftmost end, to a fixed base plate 62. Preferably, the pivoted end is journaled in a bearing assembly 64. Since the guide rods 52a, 52b are constrained to vertical movement only, a lost motion connection is used between the right end of the lever arm 60 (as viewed in FIG. 5) and the cross piece 58. In particular, a carriage pin 66 attached to the cross piece 58 is received in a slot 68 defined at the right end of the lever arm. The pin 66 may include a bearing for reducing the friction between the slot structure 68 and the pin 66. It should be apparent that as the lever arm moves upwardly or downwardly, the change in radial distance between the pivot 64 and the carriage pin 66 is accommodated by transverse movement of the pin within the slot 68.

Figure 7:
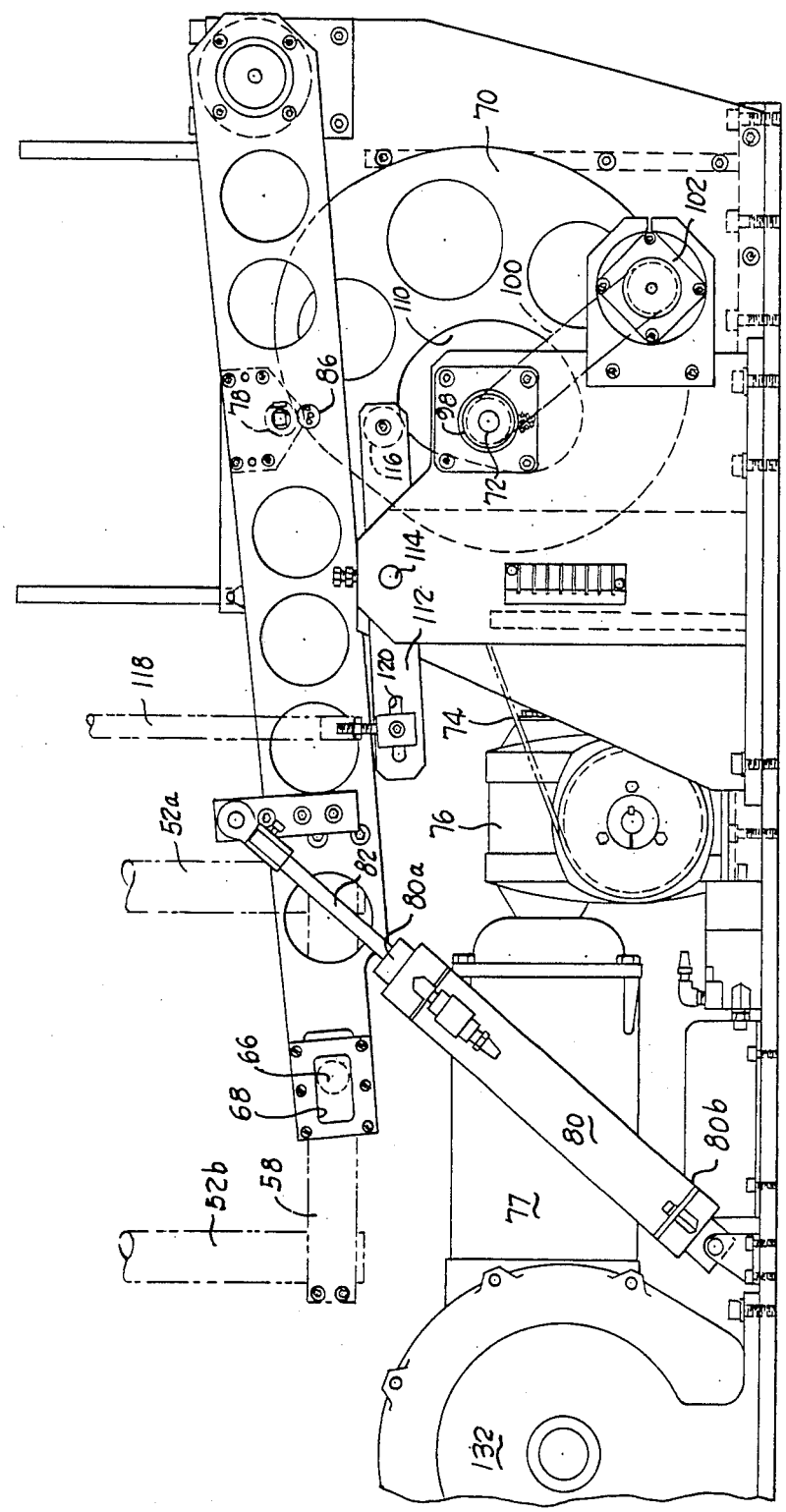
FIG. 7 is a rear, fragmentary view of the lower portion of the labeling apparatus.

Referring also to FIG. 7, the lever arm 60 is raised and lowered about its pivot 64 by a main drive cam 70. The cam is rotated about a shaft 72 by a timing belt or chain 74 operatively coupled to a gear box 76. The gear box in turn is coupled to a suitable drive motor 77. The timing belt 74 is reeved around drive and driven timing spockets 81, 83 attached to the gearbox 76 and shaft 72, respectively (shown best in FIG. 6).

The lever arm 60 mounts a cam follower 78 intermediate its ends that rides against the cam 70. Rotation of the cam 70 produces angular, reciprocating motion in the lever arm 60 about its pivot 64 which in turn imparts vertical, rectilinear reciprocating movement in the slide rods 52a, 52b and hence the label applying assembly 46.

According to the invention, the cam follower 78 is biased into continuous contact with the periphery of the cam 70 by a biasing device 80. In the preferred embodiment, the biasing device comprises a pneumatic cylinder pressurized to a predetermined pressure. Preferably, the cylinder is initially filled with a relatively low pressure, i.e., 10–20 psi. Once pressurized, the discharge of the pressurized air is prevented as by a check valve (not shown) and the cylinder thus acts as a pneumatic spring.

When the cam follower 78 is at the lowest position on the cam 70, an actuating rod 82 of the air cylinder 80 is in its retracted position. At this position, the pressure in the cylinder would be the minimum pressure. As the cam 70 rotates to raise the lever arm 60, the cylinder 80 is forced to extend and in so doing compresses the air charge within the cylinder thus increasing the downwardly directed force the cylinder applies to the lever arm 60. The cam follower 78 is thus constantly urged into contact with the cam 70.

According to a feature of the invention, a sensor monitors the contact between the cam roller 78 and the main drive cam 70 and deactivates the drive system should separation between the follower 78 and cam 70 be detected. In the preferred embodiment, the sensor is carried by the lever arm 60 and may comprise a light source 84 and a light sensor 86 disposed on opposite sides of the cam follower 78, in alignment with the region of contact between the cam 70 and the cam follower 78 (shown only in FIGS. 6 and 7). As long as the cam follower remains in contact with the cam, light from the source is blocked. Should the cam follower separate, the light sensor 86 responding to the detection of light would deactivate the drive motor 77 to stop rotation of the cam 70.

Referring in particular to FIGS. 5 and 6, the drive system preferably includes a braking arrangement for arresting motion in the cam virtually instantaneously upon sensing separation of the cam 70 and cam follower 78. This is achieved by a brake disc 90 (shown in FIG. 6) which is also mounted to the shaft 72 and co-driven with the cam 70. A pair of disc brake calipers 92 are mounted to a braking plate 96 and overlie portions of the disc 90. Suitable pneumatically operated brake disc calipers are available from Horton Manufacturing Company.

With the present invention, when a malfunction is sensed, movement in the drive system is stopped immediately. Separation of the cam follower 78 from the cam 70 will normally occur due to a jam or other malfunction in the label applying assembly 46. Once separation of the cam and cam follower is sensed the disc brake 90 inhibits the cam from recontacting the cam follower which could otherwise aggravate the malfunction.

The use of an air cylinder to bias the lever arm 60 into contact with the cam 70 provides an added feature of the invention. It has been found that when a jam or other malfunction occurs in the labeling applying assembly 46, the carriage 50 including the slide rods 52a, 52b and labeling assembly 46 must ordinarily be raised in order to correct the malfunction. In the prior labeling apparatus, the unit was counterweighted in order to enable an operator to manually raise the label applying assembly 46. With the present invention, this procedure has been simplified. Referring in particular to FIG. 7, in normal operation, the rod end 80a of the air cylinder 80 is pressurized in order to apply a downwardly directed biasing force to the lever arm 60. However, when a malfunction occurs, an operator control (not shown) located on the operator control panel may be actuated to pressurize the cylinder end 80b of the air cylinder in order to extend the rod 82. It should be apparent that extending the rod 82 causes the lever arm 60 to be driven upwardly and hence raises the slide rods 52a, 52b and label applying assembly 46. When the malfunction has been corrected, the cylinder end 80b is depressurized in order to lower the lever arm 60 until the cam follower 78 contacts the cam 70.

Referring to FIGS. 6 and 7, the shaft 72 also mounts a small timing sprocket 98. A timing belt 100 connects the timing sprocket 98 to a digital encoder 102. The encoder 102 is connected to an electronic control system (not shown) forming part of the labeling apparatus which effects control of the various labeling functions. The digital encoder 102 generates sychronizing signals for the electrical control system so that the various machine functions are coordinated with the position of the main drive cam 70.

According to the invention and referring to FIGS. 6 and 7, the drive shaft 72 also mounts a second cam 110, smaller than the main drive cam 70. The cam 110 reciprocally drives a product indexing lever 112. The lever 112 is centrally pivoted at a pivot assembly 114 and mounts a cam follower 116 at its rightmost end (as viewed in FIG. 7). The leftmost end is pivotally connected to a drive rod 118. A slot 120 formed at the left end of the lever 112 provides for a radial adjustment for modifying the stroke of the rod 118.

The drive rod 118 is connected to a pusher assembly that is operative to advance containers into the labeling station 26. Referring to FIG. 4, the pusher assembly includes an L-shaped arm 120 that mounts a pusher plate (not shown). A linkage (not shown) connected to the actuating rod 118 converts vertical, reciprocating motion in the actuating rod 118 into transverse reciprocating motion in the L-shaped pusher arm towards and away from the labeling station 26. In the preferred embodiment an air cylinder (not shown) like the air cylinder 80 is used to bias the lever arm 112 into contact with the product indexing cam 110. By mounting both the main drive cam 70 and the indexing drive cam 110 on the common shaft 72, synchronization between the labeling and advancing functions is automatically achieved. The cam drive system for the advancing mechanism also eliminates the separate drive motor and clutch mechanism shown and described in U.S. Pat. No. 4,412,876 and therefore simplifies the overall product indexing function of the the labeling machine.

Referring to FIG. 7, the drive system of the present invention allows the machine to be operated at a higher production rate without comprising the quality or reliability of the label applying operation. This is accomplished by configuring the main drive cam 70 to impart a differential rate of motion to the label applying assembly 46 during the label applying and return strokes. As seen in FIG. 7, the profile of the cam 70 is assymetrical in shape. When the cam 70 is rotated in the counter-clockwise direction, the fall of the cam occurs much more gradually than the rise of the cam. As a result, the downward movement of the labeling assembly 46 occurs at a lower average speed than its upward or return movement. In the preferred cam profile, the fall of the cam occurs over 240° of rotation whereas the rise occurs in 120° of rotation. As a result, the labeling assembly 46 retracts at twice the rate it applies a label.

With the preferred configuration, the rate at which containers are labeled by the labeling machine can be increased without adversely affecting the quality and reliability of the label applying procedure. The increased speed is achieved by increasing the rate at which the label applying assembly is returned to its starting position. The actual label applying motion occurs at an average speed and/or acceleration levels comparable to the speed at which a harmonically driven label assembly would apply the labels.

Turning now to FIG. 8, additional details of the labeling station are illustrated. The container to be labeled is advanced to a position below the mandrel 40. Transverse guides 126, 128 (shown only in FIG. 4) center and guide the bottle into the labeling position below the mandrel 40 (shown only in FIG. 8). A vacuum pedestal 126 is aligned with the mandrel and operates to stabilize or clamp the bottle in proper alignment. (In FIG. 4, the vacuum pedestal is obscured by a cover 128.) The pedestal includes a perforate region 130 (a portion of which is shown in FIG. 1) which communicates with a source of vacuum. The source comprises a vacuum pump 132 (shown in FIGS. 3 and 5-7). Conduits (not shown) connect the perforate region 130 with the vacuum source. In FIG. 4, the vacuum pedestal is obscured by a cover 128. In the preferred embodiment, a filter indicated generally by the reference character 140 is disposed in the flow path intermediate the perforate region 130 and the vacuum pump 132. The filter prevents dirt and other foreign matter, drawn into the vacuum pedestal 126, from entering the vacuum motor.

According to a feature of the invention, and as shown in FIGS. 9-11, the pedestal includes a butterfly valve assembly 150 rotated between opened and closed position by a rotary solenoid actuator 152. The lower end of valve assembly 150 includes a nipple 154 for connection to a vacuum conduit (not shown). A shaft 152a of the solenoid actuator 152 is coupled to a valve shaft 156 on which a butterfly plate 158 is mounted, by a coupling 160.

The actuation of the solenoid valve is controlled by the electrical control system and is synchronized with the bottle advancing mechanism. When the labeling cycle has been completed the valve closes to terminate the vacuum force on the labeled container to facilitate its advancement out of the labeling station 26. As the product leaves the labeling station 26, the valve is reopened in order to exert a clamping force on the next container. When the valve is closed, the conduits and filter compartment act as an accumulator so that when the valve is initially opened, a large inrush of air occurs and enhances the initial gripping action and aids in the stabilization and positioning of the bottle to be labeled.

The construction and operation of the labeling apparatus 46, specifically the labeling assemblies 46a, 46b, is fully set forth in U.S. Pat. No. 4,412,876, and a complete and exhaustive description is therefore unnecessary. By way of summary, the assemblies 46a, 46b are essentially mirror images of the other. Only the assembly 46b will therefore be described. Each assembly includes a cuff 152 and an associated gripper pad assembly 154 which when clamped together are operative to grip a lower portion of a label to be applied. The cuff 152 forms part of a laterally movable base plate 156 which is slidably mounted on a pair of guide rods 158, 159. A spring 160 biases the base plate towards the centerline of the labeling station.

The gripper pad assembly is slidably mounted on the base plate by a pair of slide rods 162 (only one slide rod is shown). A spring 164 biases the gripper pad assembly 154 towards the cuff 152. A lever arrangement 165 cooperates with a cam 166 to produce transverse movement in the gripper assembly 154 at predetermined positions during a labeling cycle. A cam roller (not shown) forming part of the base plate structure 156 coacts with a cam 168 defining a ramp 168a.

In normal operation, the cuff 152 and gripper pad 154 separate when the assembly 46b is at its uppermost position so that a lower region of the next available label can be received. At the commencement of the labeling cycle, an actuator drives the gripper assembly into contact with the cuff 152 so that the label is firmly gripped by the assembly 46b. The assembly 46b then moves downwardly along with the gripped label. The cam roller forming part of the base plate structure contacts the cam 168a and causes the base plate structure and hence the cuff 152 and gripper pad 154 to move outwardly to clear the periphery of the bottle being labeled. As the assembly 46b reaches the bottom of the stroke, the lever 165 contacts the cam and causes the gripper assembly to separate from the cuff thus releasing the label. Further downward movement then allows the cuff to completely release a label allowing the assembly to retract in order to engage another label.

Turning now to FIGS. 8 and 12-14, an improved label applying apparatus is illustrated. Although the label applying mechanism described above and shown in FIG. 4 can be used, it is believed that the label applying assembly shown in FIGS. 8 and 12-14 can install a label on a container with less risk of distortion or damage, especially at the higher speeds achievable by the disclosed labeling machine.

The improved labeling assembly is adjustably clamped to the actuating rods 52a, 52b in substantially the same way the assembly shown in FIG. 4 is clamped. As viewed in FIG. 8, the labeling assembly includes left and right gripper assemblies 44a', 44b' connected to the slide rods 52a, 52b respectively. Each gripper assembly is effective to grip a lower portion of a label positioned at a labeling station (on the mandrel 40). The label is then pulled downwardly over the container at the labeling station. The gripper assemblies 44a', 44b' release the label when properly positioned on the container and then both are driven upwardly again to repeat the label applying cycle.

Figure 12:
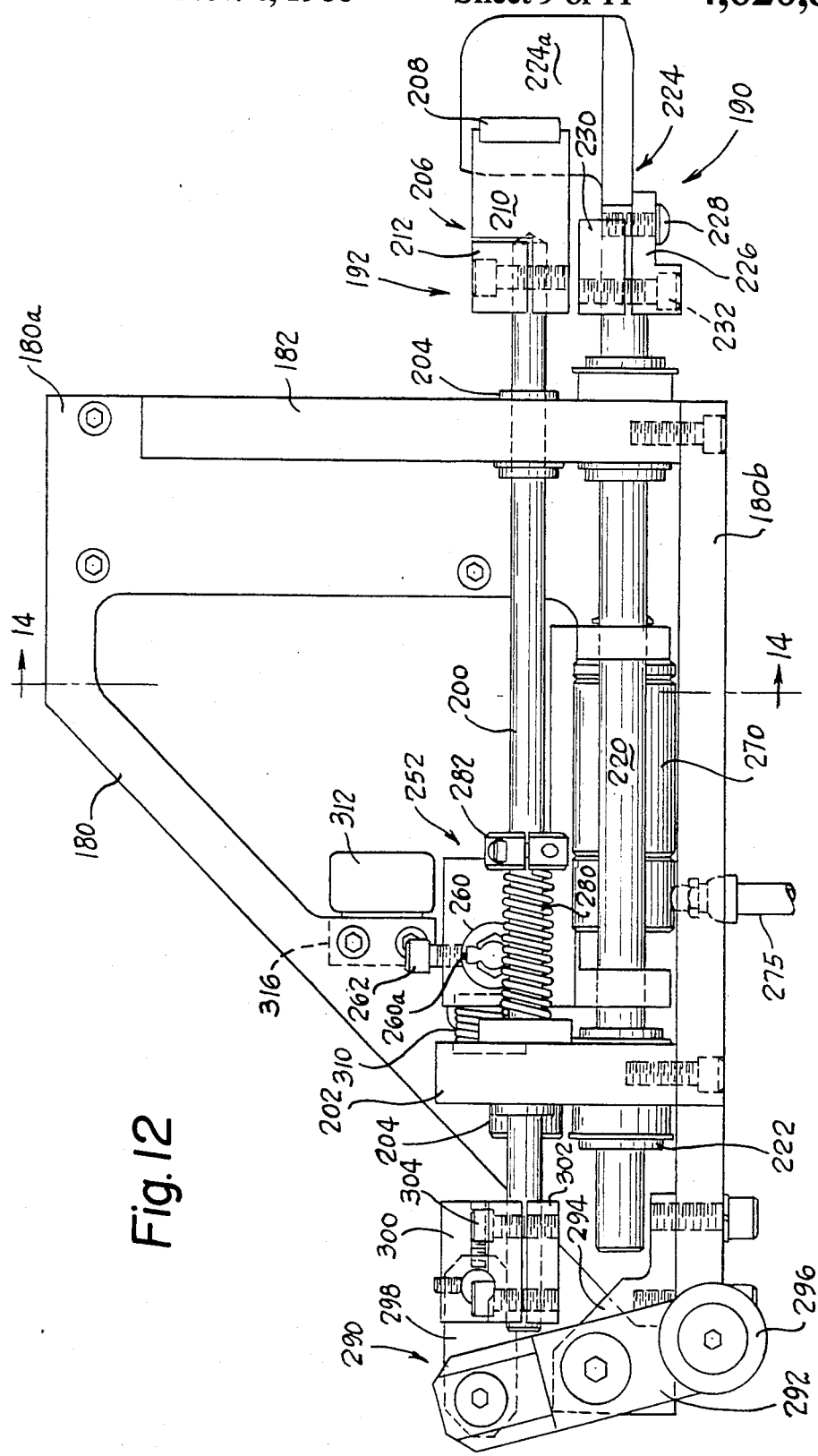
FIG. 12 is a front, elevational view of a gripper assembly forming part of the labeling assembly shown in FIG. 8.
Figure 13:
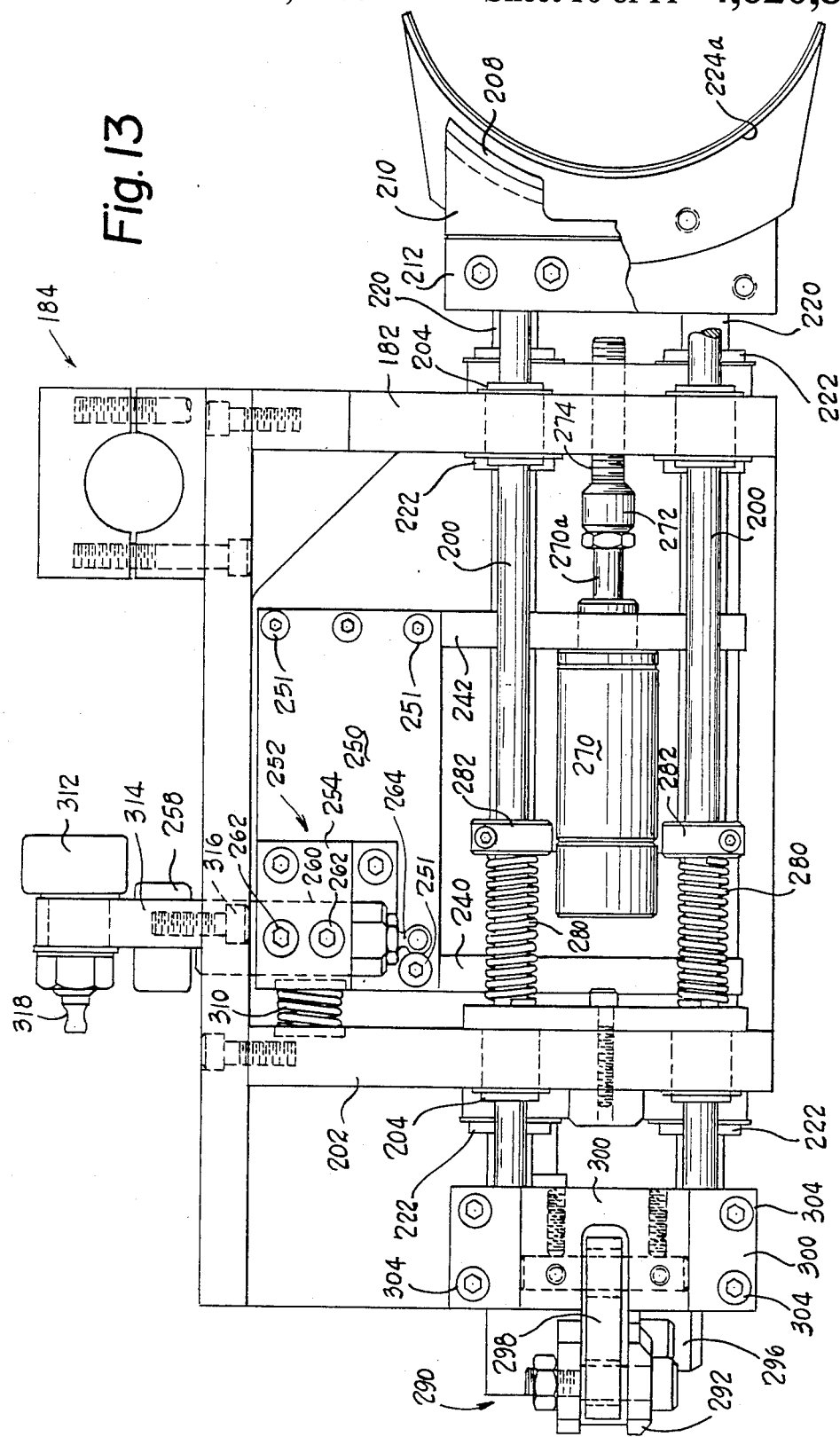
FIG. 13 is a top plan view of the gripper assembly.

The gripper assemblies 44a', 44b' are similarly constructed and in effect are mirror images of each other. The detailed construction of the assembly 44a is illustrated in FIGS. 11-13. The gripper assembly 44a includes a rigid support frame 180 which is essentially L-shaped having a vertical wall 180a and a transverse wall 180b. A gusset plate 182 extends between the vertical and transverse walls and rigidizes the overall structure. The vertical wall 180a of the frame 180 mounts a pair of clamping blocks 184 by which each gripper assembly 44a', 44b' is adjustably clamped to respective slide rods 52a, 52b (shown in FIGS. 4 and 5). The frame 180 slidably mounts a cuff subassembly indicated generally by the reference character 190 and a gripper block subassembly indicated generally by the reference character 192. As shown best in FIG. 8, the cuff and gripper block subassemblies 190, 192 cooperate to grip a lead label "L" of the chain or web of labels 34 when the gripper assemblies 44a', 44b' are in their uppermost positions, indicated in phantom by the reference character 196. The gripped label "L" is pulled downwardly over a bottle "B" as the gripper assemblies 44a', 44b' are driven downwardly by the drive system.

The gripper block subassembly 192, as seen best in FIGS. 12 and 13, includes a pair of slides 200 slidably supported for reciprocating movement by the gusset 182 and a spaced, parallel support wall 202 forming part of the assembly frame 180. The slides 200 are preferably supported by linear ball bearings 204 which are available from Thomson Industries, Inc. A gripper member 206 is clamped near the ends of the slides 200. The gripper member 206 includes a pair of spaced arcuate pads 208, preferably constructed from an elastomeric material which are fixed to a pad support block 210 which in turn is clamped to the slides 200 by a clamping bar 212.

The cuff subassembly 190 includes a pair of slides 220 which are also slidably supported by bearings 222 mounted in the gusset plate 182 and the support wall 202. Like the bearings 204, the bearings 222 are preferably linear ball bearings such as those available from Thomson Industries, Inc.

A cuff member 224 is mounted near the ends of the slides 220. The cuff member 224 defines an arcuate wall 224a which preferably conforms somewhat to the periphery of the bottle "B". The cuff member 224 is mounted to the ends of the slides 220 by a clamping arrangement comprising a lower clamp block 226, fastened to the cuff 224 by fasteners 228 and an upper clamp block 230 which is clampingly engaged by fasteners 232 that extend through the lower clamp block 226 and are threadedly received by the upper clamp block 230.

Figure 14:
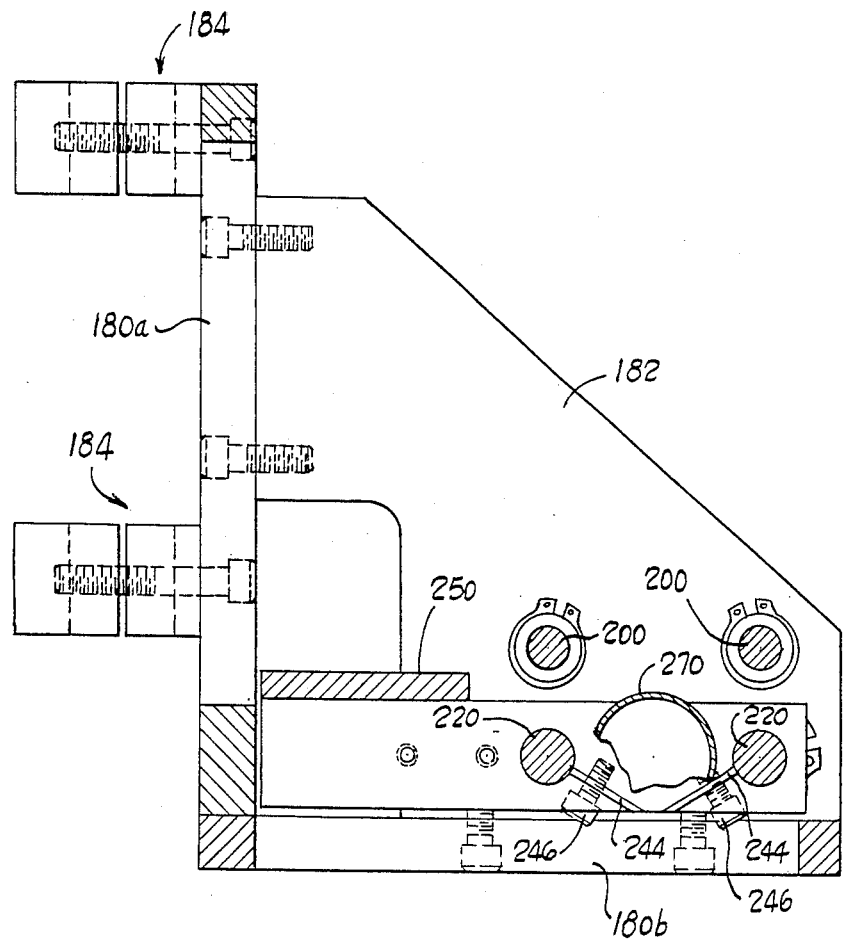
FIG. 14 is a sectional view as seen from the plane indicated by the line 14—14 in FIG. 12.

As seen best in FIG. 13, a pair of spaced, parallel bars 240, 242 are clamped to the slides 220. Referring to FIG. 14, the bars 240, 242 (only the bar 242 is shown), each include a slot 244 and a clamping screw 246 by which the bars are fixed in position to the slides 220.

Referring to both FIGS. 13 and 14, a platform 250 is rigidly fastened to and spans the bars 240, 242. A plurality of fasteners 251 secures the platform 250 to the bars 240, 242. The platform 250 not only fixes the spatial distance between the bars 240, 242 but also mounts a cam roller subassembly 252. The cam roller subassembly includes a mounting block 254 fastened to the platform 250 which adjustably supports a cam roller 258. The cam roller 258 is rotatable at the end of a non-rotating shaft 260 including a flat 260a (shown only in FIG. 12) which is clamped in a predetermined axial position to the mounting block 254 by a pair of threaded fasteners 262. A grease fitting 264 mounted at the end of the shaft 260 facilitates lubrication of the cam roller.

An air actuator 270 preferably an air cylinder is mounted to the bar 242 and includes an actuating rod 270a carrying a threaded fitting 272. The fitting 272 abuttably engages a threaded pin 274 mounted in the gusset 182. An air line 275 (shown only in FIG. 12) is connected to the cylinder 270.

When the air cylinder 270 is actuated to extend the actuating rod 270a, the abutting engagement between the fitting 272 and the pin 274 causes the cuff subassembly 190 to move leftwardly (as viewed in FIG. 13) and engage the gripper subassembly 192. In particular, the arcuate surface 224a of the cuff 224 abuttably engages the gripper pads 208. In the preferred embodiment the leftward movement of the cuff subassembly 190 by the actuator 270 is limited by a mechanical stop within the air cylinder itself.

As best seen in FIGS. 12 and 13, the slide rods 200 of the gripper subassembly 192 are each spring biased by an associated spring 280 which acts between the frame wall 202 and associated adjustable collar 282. When the cylinder 270 is actuated to move the cuff assembly 190 leftwardly, the clamping force exerted by the gripper pads 208 on the surface 224a of the cuff 224 is determined by the extent of compression of the springs 280 which is adjustable by the collars 282.

Leftward and rightward movement of the gripper subassembly 192, independent of the cuff subassembly 190 is provided by a lever arrangement indicated generally by the reference character 290. The assembly 290 includes a lever 292 pivotally mounted to a pivot support block 294 which is fixed to the base plate 180b of the frame 180. The lower end (as viewed in FIG. 12) of the lever 292 rotatably mounts a cam roller 296 whereas the upper end of the lever 292 is pivotally connected to a coupling link 298 that in turn is pivotally connected to a mounting block 300. The mounting block 300 is clamped to the slide rods 200 by a clamping bar 302 which threadedly receives fasteners 304 that extend downwardly from the mounting block 300. It should be apparent that transverse movement imparted to the cam roller 296 will produce attendant movement in the gripper subassembly 192. As will be explained, the cam roller 296 is engageable with a cam 306 (shown in FIG. 8) forming part of the labeling machine to cause the gripper pads 208 to disengage the cuff 224 at a predetermined position in the labeling cycle.

The cam roller 258 supported by the mounting block 254 is also engageable with a cam 308 forming part of the labeling machine at predetermined operating positions. In the preferred arrangement, engagement with the cam 308 by the cam roller 258 produces leftward movement in cuff subassembly 190 (as viewed in FIG. 12). It should be noted, that the mounting block 254 is biased rightwardly by a spring 310 and hence the overall cuff assembly 190 is biased rightwardly. As will be more fully explained, in normal operation, the cam roller 258 and associated cam 308 produce additional leftward movement in the cuff subassembly 190 after the actuator 270 has been actuated. The actuator 270 is mounted to the bar 242 and only abuttably engages the pin 274. Consequently, when the co-engagement between the cam roller 258 and associated cam 308 cooperate to produce the leftward movement in the cuff 224, the fitting 272 at the end of the actuator rod 270a disengages and separates from the threaded pin 274.

The frame 180 also mounts an additional cam roller 312 which is seen in FIG. 13, having an axis oriented 90° with respect to the cam roller 258. The cam roller 312 is mounted in position by a support 314 which is secured to the vertical wall 180a of the frame 180 by fasteners 316. A grease fitting 318 facilitates lubrication of the cam roller. In the preferred embodiment, the cam roller 312 also coacts with the cam 308. The cam roller 312 engages a rear surface of the cam 308 as the assembly 44a' moves downwardly. The cam roller rigidizes the location of the gripper assemblies and prevents them from twisting about their associated slide rods 52a, 52b when the gripper lever 292 engages the cam 306. As should be apparent from FIG. 13, the line of action for the lever 292 is spaced from the line of action for the cam roller 258. Thus, when the lever 292 engages the cam 306, a moment is exerted on the associated slide rod 52a. The cam roller 312 bears the force generated by the moment arm defined between the clamp 184 and the lever 292 and inhibits the assembly from twisting about the slide rod.

Turning now to FIG. 8, the improved gripper assemblies 44a', 44b' operate as follows. At the commencement of a labeling cycle the drive system raises the slide rods 52a, 52b thereby raising the gripper assemblies 44a', 44b' to the uppermost position indicated in phantom by the reference character 196. In this position, a label L is located over the mandrel 40 and the cuffs 224 and gripper pads 208 are disengaged. As fully described in Pat. No. 4,412,876 slots indicated generally by the reference character 322 are located at the bottom of the mandrel 40 which allow the cuff 224 and gripper pad 208 to engage a region of the label L. According to the preferred labeling method, the actuator 270 of each gripper assembly 44a', 44b' is energized to cause the cuff subassemblies 190 to move outwardly (with respect to the axis of the bottle B). In moving outwardly, the cuff engages the gripper pad 208 to clamp a lower portion of the label to the gripper assembly. This initial outward movement by the cuffs causes the portion of the label clamped by the gripper assembly to stretch uniformly across the rear surface 224a of the cuff 224.

The position of the cuff subassembly 190 and gripper pad assembly 192 after the first outward movement of the cuffs is shown in phantom and indicated by the reference character 330. Although the actuator 270 and associated linkage can be arranged to expand the cuffs 224 to clear the periphery of the bottle B and maintain this position, in the preferred embodiment, the cuffs are mechanically moved outwardly an additional amount by the cam 308. In particular, as the assemblies 44a', 44b' move downwardly, their associated cam rollers 258 engage a respective ramp 308a of the cams 308 and cause the cuff subassemblies 190 to move outwardly an additional distance. It should also be noted that, should a failure in the actuators 270 or pressure system occur, the cam rollers 258 and cams 308 will assure that the cuff assemblies 190 are driven outwardly to clear the periphery of a bottle held at the labeling station.

The label clamped between the cuff and the gripper subassemblies 190, 192 is pulled downwardly over the bottle B. Near the bottom of the labeling stroke, the gripper operating levers 292 contact the cams 306. The lower portion of the levers are driven inwardly which causes the gripper subassemblies 192 to expand outwardly, disengaging the cuff surface 224a thereby releasing the label. Once the gripper disengages the cuff surface 224a, the frictional engagement of the label with the bottle causes the label to cease motion. The labeling assemblies 44a', 44b' continue downwardly an additional amount to enable the cuffs to completely disengage from the label. The lowermost position at which the cuff and gripper rod subassemblies are disengaged is indicated in phantom by the reference character 332.

The drive system them retracts the assemblies 44a', 44b'. As the assemblies return to the uppermost position 196, the cuffs 224 move inwardly (the actuator 270 is depressurized) to enable the cuffs to enter the inside of the mandrel 40 so that the lower region of the next label is received between the gripper pads 208 and the rear surfaces 224a of the cuffs 224. The above described cycle is repeated to install a label on the next bottle.

With the preferred labeling apparatus, distortion in the label being applied is minimized. As indicated, the lower region of the label must be stretched outwardly in order to clear the periphery of the bottle. As the material thickness of the label is decreased, the risk of distorting the indicia printed on the label also increases. The disclosed improved labeling apparatus minimizes the occurrence of this distortion.

It should be apparent that the disclosed labeling machine enables tubular flexible labels to be applied to product containers, such as plastic soft drink bottles at a greatly increased rate. This is accomplished with a straightforward, uncomplicated mechanism.

Although the invention has been described with a certain degree of particularity, it should be understood that various changes can be made to it by those skilled in the art without departing from the spirit or scope of the invention as hereinafter claimed.

We claim:

1. A drive system for actuating a labeling assembly forming a part of a labeling machine for applying tubular, flexible lables to product containers, comprising:
    (a) carriage means mounted for reciprocal movement including means for mounting said labeling assembly;
    (b) carriage actuating means including a drive cam defining an assymetrical profile such that said labeling assembly is driven through a lable applying stroke by said carriage means at an average speed that is less than an average speed at which said labeling assembly is return driven to a starting position by said carriage means;
    (c) said carriage actuating means furhter including;
        (i) a pivotally mounted lever;
        (ii) a cam follower rotatably mounted by said lever and abuttably contacting said drive cam; and,
        (iii) coupling means, connecting said lever to said carriage means such that arcuate reciprocal movement imparted to said lever by said drive cam produces reciprocal, rectilinear movement in said carriage means;
    (d) a drive motor for rotating said rivee cam;
    (e) a bottle advancing mechanism, comrising:
        (i) an indexing cam driven by said drive motor in unison with said drive cam such that said drive cam and indexing cam are continuously and concurrently rotated during drive system operation so that synchronized movement in said labeling assembly and a bottle advancing mechanism, is achieved.

2. The drive system of claim 1 wherein said coupling means comprises a pin member forming part of one of said lever and said carriage means, said pin member slidably received by structure defining a slot forming part of the other of said lever and said carriage means.

3. The drive system of claim 2 wherein said pin member forms part of said carriage means and said slot defining structure forms part of said lever.

4. The apparatus of claim 1 wherein said carriage means includes a pair of spaced slide rods to which said labeling assembly is adjustably clamped.

5. The apparatus of claim 1 wherein said lever includes a sensing means for sensing contact between said cam roller and said drive cam and said sensing means being operative to deactivate said drive system upon sensing separation of said drive cam and cam follower.

6. The apparatus of claim 1 wherein said cam follower is biased into abutting contact with said drive cam by a fluid pressure actuator pressurized with a predetermined fluid pressure thereby defining a fluid spring.

7. The apparatus of claim 6 wherein said apparatus includes means for pressurizing said actuator to another predetermined fluid pressure to effect raising of said carriage means.

8. In a labeling apparatus having a labeling assembly for applying sleeve labels to product containers, a drive system for reciprocally driving the labeling assembly, comprising:
    (a) a carriage mounted for reciprocating movement, said labeling assembly secured to said carriage;
    (b) a cam follower forming part of said carriage and a drive cam engageable with said cam follower for imparting reciprocal movement to said carriage between a label receiving position and a label applied position;
(c) a pneumatic pressure operated actuator coupled to said carriage and means for pressurizing said actuator with a predetermined pneumatic pressure to cause said actuator to apply a biasing force to said cam follower urging it into abutting contact with said drive cam as said cam drives said carriage between said positions; and,
(d) check valve means for preventing dicharge of pneumatic pressure from said actuator such that a pneumatic spring is created by the pneumatic pressure captured in said actuator.

9. The drive system of claim 8 wherein said pneumatic pressure operated actuator is a double acting actuator having two isolated pressurizable chambers, such that pressurization of one of said chambers causes said actuator to apply said biasing force to said cam follower and the pressurization of said other chamber causes said actuator to move said labeling assembly to the label receiving position.

10. A labeling apparatus for applying tubular labels to a bottle or the like, comprising:
(a) structure defining a frame;
(b) said frame including a label applying station;
(c) a label applying assembly reciprocally movable at said station, the movement of said assembly including a label applying stroke and a return stroke;
(d) drive means including differential speed imparting means for driving said labeling assembly;
(e) said differential speed imparting means including means for actuating said assembly at a first speed during said label applying stroke and at a second speed, different from said first speed, during said return stroke, said means for actuating comprising a cam defining a profile having a rate of rise greater than a rate of drop;
(f) a cam follower driven by said cam;
(g) a sensing means, forming part of said drive means, for sensing contact between said cam and cam follower and being operative to arrest rotation of said cam should loss of contact between said cam and cam follower be sensed by said sensing means.

11. The apparatus of claim 10 wherein said drive means further includes an additional cam and cam follower for driving a product advancing mechanism in synchronization with said labeling assembly.

12. In a labeling apparatus for applying sleeve labels to product containers, a retracting apparatus comprising:
(a) a carriage mounted for reciprocating movement;
(b) a labeling assembly secured to said carriage;
(c) a drive system including a cam follower forming part of said carriage and a drive cam engageable with said cam follower for imparting reciprocating movement to said carriage;
(d) a fluid pressure operated actuator coupled to said carriage including means for pressurizing said actuator with a first predetermined fluid pressure operator in order to drive said carriage to a retracted position further including means for pressurizing said fluid pressure operated actuated with a second predetermined pressure to cause the actuator to apply a biasing force to said cam follower urging it into abutting contact with said drive cam;
(e) a sensing means for monitoring the contact between said cam follower and said drive cam and operative to arrest motion in said drive cam in the event a loss of contact between said follower and cam is sensed.

13. A labeling apparatus, comprising:
(a) a labeling assembly operative to grip a tubular, flexible label and pull said label over a product container positioned in alignment with said labeling assembly;
(b) a label assembly actuating means including:
(i) a carriage means comprising a pair of reciprocal slide rods to which said labeling assembly is adjustably clamped;
(ii) a pivotally mounted lever means coupled to said carriage means;
(iii) drive cam for producing arcuate, reciprocating motion in said lever means;
(iv) a drive motor for driving said drive cam;
(v) a cam follower carried by said lever and engaging said drive cam;
(vi) coupling means connecting said lever means with said carriage means for converting said arcuate reciprocal movement in said lever means to rectilinear, reciprocal movement in said carriage means;
(vii) sensing means for monitoring contact between said cam follower and said drive cam and operative to deenergize said drive motor upon sensing separation of said cam follower and said drive cam.

14. A system for stabilizing a product container at a labeling station in a labeling apparatus for applying tubular, flexible labels to the container, comprising:
(a) a pedestal for supporting the container to be labeled in alignment with a label applying assembly;
(b) a source of differential pressure including a perforate support plate by which said differential pressure is exerted on a region of said container;
(c) valve means actuated in coordination with said labeling assembly for controlling the communication of a differential pressure source with said perforate support plate;
(d) control means for closing said valve means after a product container has been labeled and being further operative to reopen said valve means as a product container to be labeled is advanced onto said perforate support plate.

15. The apparatus of claim 14 wherein said stabilization system includes an accumulating means for accumulating said differential pressure during a time when said valve means is closed.

16. The apparatus of claim 15 wherein said accumulating means includes conduits and a filter compartment.

17. A labeling apparatus, comprising:
(a) a labeling assembly operative to grip a tubular, flexible label and pull said label over a product container positioner in alignment with said labeling assembly;
(b) a label assembly actuating means including:
(i) a carriage comprising a pair of reciprocal slide rods to which said labeling assembly is adjustably clamped;
(ii) a pivotally mounted lever means coupled to said carriage means;
(iii) an assymetrical drive cam for producing arcuate, reciprocating motion in said lever means;
(iv) a drive motor for driving said drive cam;
(v) a cam follower carried by said lever and engaging said drive cam;

(vi) coupling means connecting said lever means with said carriage means for converting said arcuate reciprocal movement in said lever means to rectilinear, reciprocal movement in said carriage means;

(vii) a bottle advanceing mechanism including an indexing cam driven by said drive motor concurrently with said drive cam such that during labeling apparatus operation, said drive cam and indexing cam are continuously and concurrently rotated in a 1-to-1 ratio such that movement in said labeling assembly and a bottle advancing member forming part of said bottle advancing mechanism is synchronized, said member operative to advance product containers into alignment with said labeling assembly.

18. The apparatus of claim 17 wherein said lever means includes a sensing means for sensing engagement between said cam follower and said drive cam and operative to deactivate said drive motor upon sensing separation of said cam follower from said drive cam.

19. The apparatus of claim 18 further including a braking means for arresting motion in said drive cam when said sensing means senses separation of said cam follower and drive cam.

20. A process for applying sleeve labels to a product container, comprising:
   (a) positioning a container to be labeled at a labeling station;
   (b) advancing a chain of interconnected labels until an end label is located at a predetermined position;
   (c) positioning a label applying assembly at said predetermined position;
   (d) clamping a region of said end label to said label applying assembly;
   (e) providing a drive system including a drive cam and an associated cam follower for driving said label applying assembly between a label receiving position and a label applied position;
   (f) driving said label applying assembly and clamped label toward said container in order to pull said label over said container;
   (g) selecting said actuating speed to minimize stress on said label as it is pulled over said bottle;
   (h) severing said end label from said chain of labels;
   (i) releasing said label when said label is in a predetermined position on said bottle;
   (j) driving said labeling assembly to said label receiving position at a second average speed greater than said first speed;
   (k) monitoring contact between said cam and cam follower and arresting motion in said drive cam should separation between said cam and cam follower be sensed.

21. The process of claim 20 wherein said step of severing said label comprises the step of braking said chain of labels prior to the end label reaching said predetermined position on said bottle.

22. The process of claim 20 wherein said second average speed is substantially twice the first average speed.

23. The process of claim 20 further comprising the step of expanding a region of said end label to a peripheral dimension greater than a peripheral dimension of said container to be labeled.

24. For a labeling apparatus, including a labeling assembly reciprocally driven through a label applying stroke and a return stroke, a drive system comprising:
   (a) a carriage means mounting said labeling assembly;
   (b) a drive cam and associated drive motor for reciprocally driving said carriage means through said label applying and return strokes;
   (c) a cam follower for receiving and transferring movement from said drive cam to said carriage means;
   (d) biasing means for urging said cam follower into contact with said drive cam;
   (e) sensing means for monitoring contact between said cam follower and said drive cam and operative to deenergize said drive motor upon sensing separation of said follower and said drive cam.

25. The apparatus of claim 24 further comprising a brake means for arresting motion in said drive cam when said sensing means senses a loss of contact between said cam follower and said drive cam.

26. The apparatus of claim 24 wherein said brake means comprises a disc co-driven with said drive cam and a disc brake energized by said sensing means.

27. The apparatus of claim 24 wherein said biasing means comprises a fluid pressure operated actuator pressurized to a predetermined pressure.

28. The apparatus of claim 27 wherein said fluid pressure operated actuator is pressurizable to a second predetermined pressure in order to drive said carriage means to a retracted position.

* * * * *

UNITED STATES PATENT AND TRADEMARK OFFICE
CERTIFICATE OF CORRECTION

PATENT NO. : 4,620,888

DATED : November 4, 1986

INVENTOR(S) : William M. Easter et al

It is certified that error appears in the above-identified patent and that said Letters Patent is hereby corrected as shown below:

Column 1, line 35, "use" should be --used--;
Column 1, line 48, "higher" should be --highest--;
Column 1, line 50, "mmet" should be --meet--;
Column 14, line 6, "lables" should be --labels--;
Column 14, line 12, "lable" should be --label--;
Column 14, line 26, "rivee" should be --drive--;
Column 14, line 27, "comrising" should be --comprising--;
Column 16, line 56, "positioner" should be --positioned--;
Column 17, line 6, "advanceing" should be --advancing--.

Signed and Sealed this

Tenth Day of March, 1987

*Attest:*

DONALD J. QUIGG

*Attesting Officer*     Commissioner of Patents and Trademarks